United States Patent
Brüll et al.

(10) Patent No.: US 11,932,115 B2
(45) Date of Patent: Mar. 19, 2024

(54) MULTI-PHASE INVERTER AND RELATED HIGH VOLTAGE TOPOLOGY

(71) Applicant: Vitesco Technologies GmbH, Hannover (DE)

(72) Inventors: Martin Brüll, Munich (DE); Florian Uhrig, Munich (DE)

(73) Assignee: Vitesco Technologies GmbH (DE)

( * ) Notice: Subject to any disclaimer, the term of this patent is extended or adjusted under 35 U.S.C. 154(b) by 377 days.

(21) Appl. No.: 17/283,331

(22) PCT Filed: Oct. 8, 2019

(86) PCT No.: PCT/EP2019/077246
§ 371 (c)(1),
(2) Date: Apr. 7, 2021

(87) PCT Pub. No.: WO2020/074531
PCT Pub. Date: Apr. 16, 2020

(65) Prior Publication Data
US 2021/0379997 A1    Dec. 9, 2021

(30) Foreign Application Priority Data
Oct. 10, 2018    (DE) .................... 10 2018 217 309.5

(51) Int. Cl.
*H02P 27/00*    (2006.01)
*B60L 15/00*    (2006.01)
(Continued)

(52) U.S. Cl.
CPC ............. *B60L 15/007* (2013.01); *B60L 50/75* (2019.02); *B60L 53/24* (2019.02); *H02M 7/537* (2013.01); *H02P 27/06* (2013.01)

(58) Field of Classification Search
CPC ........ B60L 15/007; B60L 53/24; B60L 50/75; H02M 7/537; H02P 27/06; H02P 29/00
See application file for complete search history.

(56) References Cited

U.S. PATENT DOCUMENTS

7,199,535 B2    4/2007    Welchko et al.
7,990,098 B2 *  8/2011    Perisic .................... B60L 50/61
                                                                363/55
(Continued)

FOREIGN PATENT DOCUMENTS

CN    101091304 A    12/2007
CN    101434205 A    5/2009
(Continued)

OTHER PUBLICATIONS

International Search Report and Written Opinion for International Application No. PCT/EP2019/077246, dated Jan. 20, 2020, 13 pages.
(Continued)

*Primary Examiner* — Karen Masih
(74) *Attorney, Agent, or Firm* — Buchanan Ingersoll & Rooney PC

(57) ABSTRACT

An electrical system for operating an AC electric motor in conjunction with a DC electrical energy storage and a DC electrical energy source is presented. It includes a multi-phase inverter or set of inverters, wherein multiple AC phases of the inverter or inverters are coupled to the motor, and separate DC connections of the inverter or inverters are coupled to the DC electrical energy source and the DC electrical energy storage.

16 Claims, 3 Drawing Sheets

(51) Int. Cl.
  *B60L 50/75* (2019.01)
  *B60L 53/24* (2019.01)
  *H02M 7/537* (2006.01)
  *H02P 27/06* (2006.01)

(56) References Cited

U.S. PATENT DOCUMENTS

| | | | |
|---|---|---|---|
| 8,002,056 | B2 | 8/2011 | Chakrabarti et al. |
| 8,483,897 | B2 | 7/2013 | Marus et al. |
| 8,487,568 | B2 | 7/2013 | Franke |
| 10,611,248 | B2 | 4/2020 | Tian et al. |
| 10,787,088 | B2 | 9/2020 | Brüll et al. |
| 2009/0033251 | A1 | 2/2009 | Perisic et al. |
| 2010/0013301 | A1 | 1/2010 | Hamada et al. |
| 2010/0320014 | A1 | 12/2010 | Woody et al. |
| 2011/0133677 | A1 | 6/2011 | Franke |
| 2013/0293165 | A1 | 11/2013 | Feuerstack et al. |
| 2014/0239869 | A1 | 8/2014 | Gorka et al. |
| 2015/0283911 | A1 | 10/2015 | Ambrosio |
| 2015/0306972 | A1 | 10/2015 | Hoevenaars et al. |
| 2018/0029486 | A1 | 2/2018 | Pfeilschiffer et al. |
| 2019/0135132 | A1 | 5/2019 | Brüll et al. |
| 2019/0255960 | A1 | 8/2019 | Töns et al. |
| 2020/0231066 | A1* | 7/2020 | Kong ................. B60L 50/50 |

FOREIGN PATENT DOCUMENTS

| | | | |
|---|---|---|---|
| CN | 101931365 | A | 12/2010 |
| CN | 102398530 | A | 4/2012 |
| DE | 102011088457 | A1 | 6/2013 |
| DE | 102014218738 | A1 | 3/2016 |
| DE | 102015207413 | A1 | 10/2016 |
| DE | 102016209905 | A1 | 12/2016 |
| DE | 102016011238 | A1 | 4/2017 |
| DE | 102015224090 | A1 | 6/2017 |
| DE | 102018215085 | A1 | 3/2020 |
| JP | 2000125411 | A | 4/2000 |
| JP | 2006238686 | A | 9/2006 |
| JP | 2008125258 | A | 5/2008 |
| KR | 1020090062334 | A | 6/2009 |
| WO | 2013182212 | | 12/2013 |
| WO | 2017211655 | A1 | 12/2017 |
| WO | 2017211656 | A1 | 12/2017 |
| WO | 2017211657 | A1 | 12/2017 |
| WO | WO-2020169361 | A1 * | 8/2020 |

OTHER PUBLICATIONS

Japanese Notification of Reasons for Refusal for Japanese Application No. 2021-519790, dated Jun. 6, 2022 with translation, 11 pages.
Korean Notice to Submit Response for Korean Application No. 10-2021-7013941, dated Oct. 20, 2022 with translation, 11 pages.
German Examination Report for German Application No. 10 2018 217 309.5, dated Dec. 7, 2023 with translation, 18 pages.
Chinese Office Action for Chinese Application No. 201980066919.1 dated Dec. 14, 2023 with translation, 19 pages.

* cited by examiner

MULTI-PHASE INVERTER AND RELATED HIGH VOLTAGE TOPOLOGY

CROSS REFERENCE TO RELATED APPLICATIONS

This application is the U.S. National Phase Application of PCT International Application No. PCT/EP2019/077246, filed Oct. 8, 2019, which claims priority to German Patent Application No. 10 2018 217 309.5, filed Oct. 10, 2018, the contents of such applications being incorporated by reference herein.

FIELD OF THE INVENTION

The invention relates to an inverter configuration, and in particular a configuration which is advantageous for vehicles with electric drive motor, drive or traction battery, and fuel cell. The present invention improves systems with a combination of different power supplies and charging devices, provides associated methods, and is situated in the field of motors or alternators powered by rechargeable batteries and/or fuel cells. The invention may advantageously be applied to electric motor vehicles in which the fuel cell and/or battery can power the motor via an inverter, and also perhaps be recharged from an electrical network when the motor vehicle is at a standstill.

BACKGROUND OF THE INVENTION

Electrified vehicles including hybrid-electric vehicles (HEVs) and battery electric vehicles (BEVs) typically comprise a traction (or high-voltage) battery which provides power to an electric drive or traction motor or machine for propulsion. Power inverters are used to convert direct current (DC) power to alternating current (AC) power. The typical AC traction machine is a 3-phase motor that may be powered by 3 sinusoidal currents each driven with 120 degrees phase separation, but any number of phases may be envisaged. In particular, a drive motor may have 6 phases.

An electrified vehicle may use a fuel cell to provide electrical power, either as the sole source of electrical power to the battery and the motor, or in addition to an external DC or AC network supply with which the battery may be charged.

In order to recharge the high voltage batteries, the vehicle may also be equipped with an embedded charging device comprising an AC/DC converter which makes it possible to rectify the AC power from the electrical network to charge the batteries. The vehicle may also be equipped with a DC/DC converter to adapt the network voltage level to the voltage level of the batteries.

In such a configuration, the battery and the fuel cell are DC elements, and the drive motor may be an AC element, and inverters may be used to transfer the electrical energy between the different elements.

The inverter or inverters may be Analog Phase Voltage Inverters, as disclosed in the applications WO 2017211655 A1, WO 2017211656 A1, and WO 2017211657 A1, which documents are included by reference. Analog Phase Voltage (APV) Inverters typically use either a half bridge or H-bridge boost converter with a high frequency (for example, >200 kHz) to do the necessary conversion between AC and DC voltages.

In some configurations, fuel cell and battery may be connected in different topologies with one or more DC/DC converters and a DC link. An inverter to drive the motor may also be connected to the DC link.

However, given the number of elements in a vehicle with battery and fuel cell (or perhaps multiple instances of each), it may be advantageous to reduce the complexity of the interconnect topology in order to optimize costs, and in particular the cost of electronics for voltage converters and inverters.

The power switches of an inverter or inverters in particular may add additional cost due to the high current and or voltage requirements. Typical power switches may be MOSFET's or IGBT's. The more power storage or power generation or power consumption elements are involved, the higher the costs. Therefore, it may be desirable to find approaches which reduce the costs of the power electronics, especially in architectures and topologies where there are multiple power storage, power generation, and power consuming elements.

In some systems, a high-voltage DC link between battery and inverter brings a voltage independence between drivetrain inverter and battery voltage. An Analog Phase Voltage Inverter (APV), a Half-Bridge Boost converter operating at High Frequency (>200 kHz), may be used to create a sinus wave on the boosted voltage side.

Electric components of the power supply subsystem and of the charging subsystem may add additional cost. Powering the motor and charging the batteries are performed with different phases. Therefore, it may be advantageous to reuse the components used to supply the electric motor with power, to implement the electrical power transfer and battery charging. In addition, it may be possible to reuse the motor as part of the advantageous concept.

SUMMARY OF THE INVENTION

An embodiment of the invention comprises a multi-phase inverter or set of inverters, with AC phases being used between a DC electrical energy source and electrical machine or motor, and DC electrical energy storage and electrical machine or motor. The DC sides of the inverter or inverters may be coupled to an electrical energy storage such as a battery and/or may be coupled to an electrical energy source such as a fuel cell. A particularly advantageous implementation comprises two 3-phase APV inverters, which on the AC side are connected to the same electrical machine (e-machine) or motor, and on the DC side one is connected to a battery, and the other is connected to a fuel cell. The AC phases form an AC link between the DC energy storage and energy source elements.

In embodiments, two inverters may be used to drive one motor using shared AC phases. For example, the inverters may share three AC phases to drive the motor or e-machine. Other embodiments may use phases which are not interconnected; rather, each inverter drives separate phases of a multi-phase motor. In the case of three-phase inverters, the resulting configuration has 6 phases available to drive the e-machine or motor. A strict galvanic separation can thus be achieved between the circuitry associated with an electrical storage (battery) via a first inverter, and the circuitry associated with an electrical source (fuel cell) via a second inverter.

An embodiment of the invention may use H-bridges of the inverter for connection to an AC network or electrical grid, both as a charging source e.g. for a battery and/or to receive electrical power. Another embodiment of the invention may use H-bridges of the inverter for connection to a DC network or electrical grid, both as a charging source e.g. for a battery and/or to receive electrical power.

DETAILED DESCRIPTION OF THE PREFERRED EMBODIMENTS

Figure 1A:
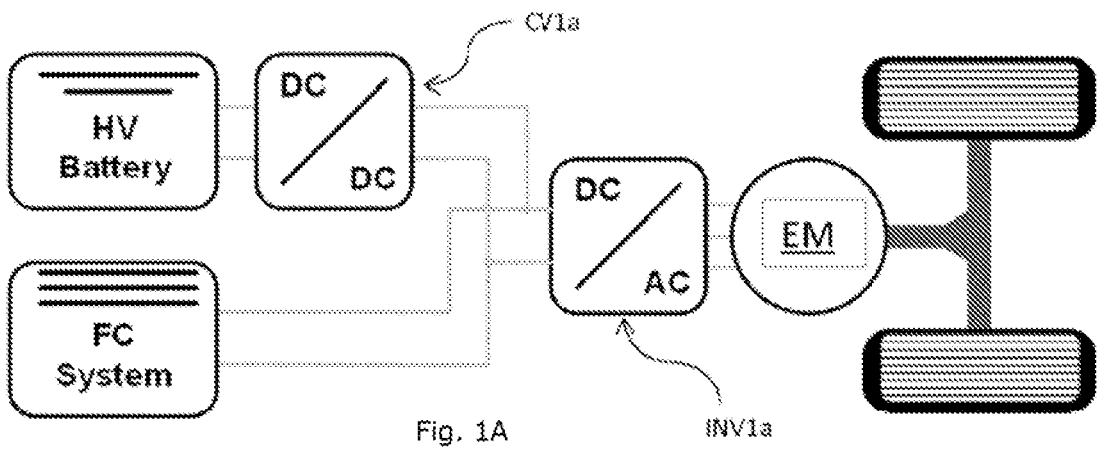
FIGS. 1A-1C show different topologies of battery and fuel cell which are used in electrically-driven vehicles.
Figure 1B:
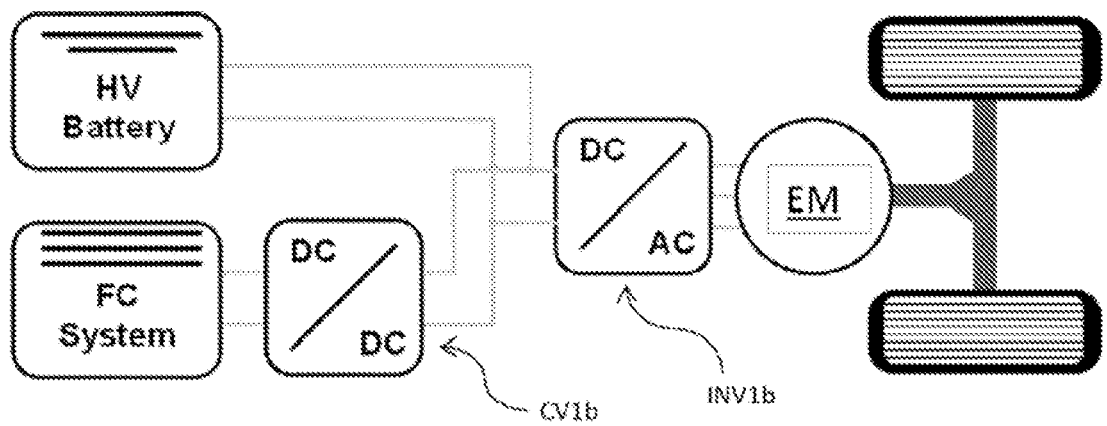
Figure 1C:
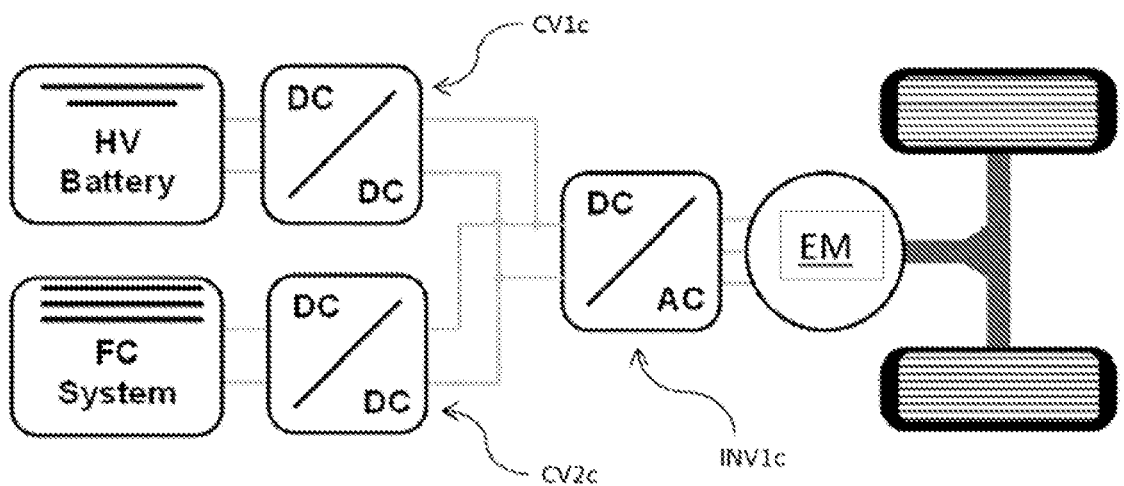

Possible basic electrical topologies of a fuel-cell vehicle are shown schematically in FIGS. 1A-1C. FIG. 1A shows a topology where the AC side of an inverter INV1a drives an electric motor or e-machine EM. The motor in turn drives the wheels. The DC side of the inverter gets power from, and is connected to, a fuel cell system FC. The DC connection between fuel cell and inverter is also electrically connected or coupled to a DC-DC converter CV1a, which is in turn connected to a high-voltage DC battery HV. In this topology, the fuel cell and the DC side of the inverter operate at a common DC voltage, which is typically determined by an appropriate operating voltage for the fuel cell system. The AC voltage for the electric or traction motor EM is determined by the inverter as appropriate for the motor and the drive which is desired from the motor.

FIG. 1B shows a different topology. Again, the AC side of an inverter INV1b drives an electric motor or e-machine EM. The motor in turn drives the wheels. The DC side of the inverter gets power from, and is connected to, a high-voltage DC battery HV. The DC connection between battery and inverter is also electrically connected or coupled to a DC-DC converter CV1b, which is in turn connected to a fuel cell system FC. In this topology, the battery and the DC side of the inverter operate at a common DC voltage, which is typically determined by an appropriate operating voltage for the battery. The voltage for the fuel cell is independent of the battery voltage, due to the operation of the DC-DC converter. The AC voltage for different phases of the electric or traction motor EM is determined as appropriate for the motor and the drive which is desired from the motor, and is substantially independent of the DC voltages.

FIG. 1C shows yet another topology. The AC side of an inverter INV1c drives an electric motor or e-machine EM. The DC side of the inverter gets power from, and is connected to, two DC-DC converters CV1c and CV2c. DC-DC converter CV1a is in turn connected to a high-voltage DC battery HV. DC-DC converter CV1b is connected to a fuel cell system FC. In this topology, the voltages for the fuel cell and the battery voltage are independent of each other and the DC side of the inverter, and vice versa, due to the operation of the two DC-DC converters. The AC voltage for different phases of the electric or traction motor EM is still determined as appropriate for the motor and the drive which is desired from the motor, and remains substantially independent of the DC voltages.

Figure 2:
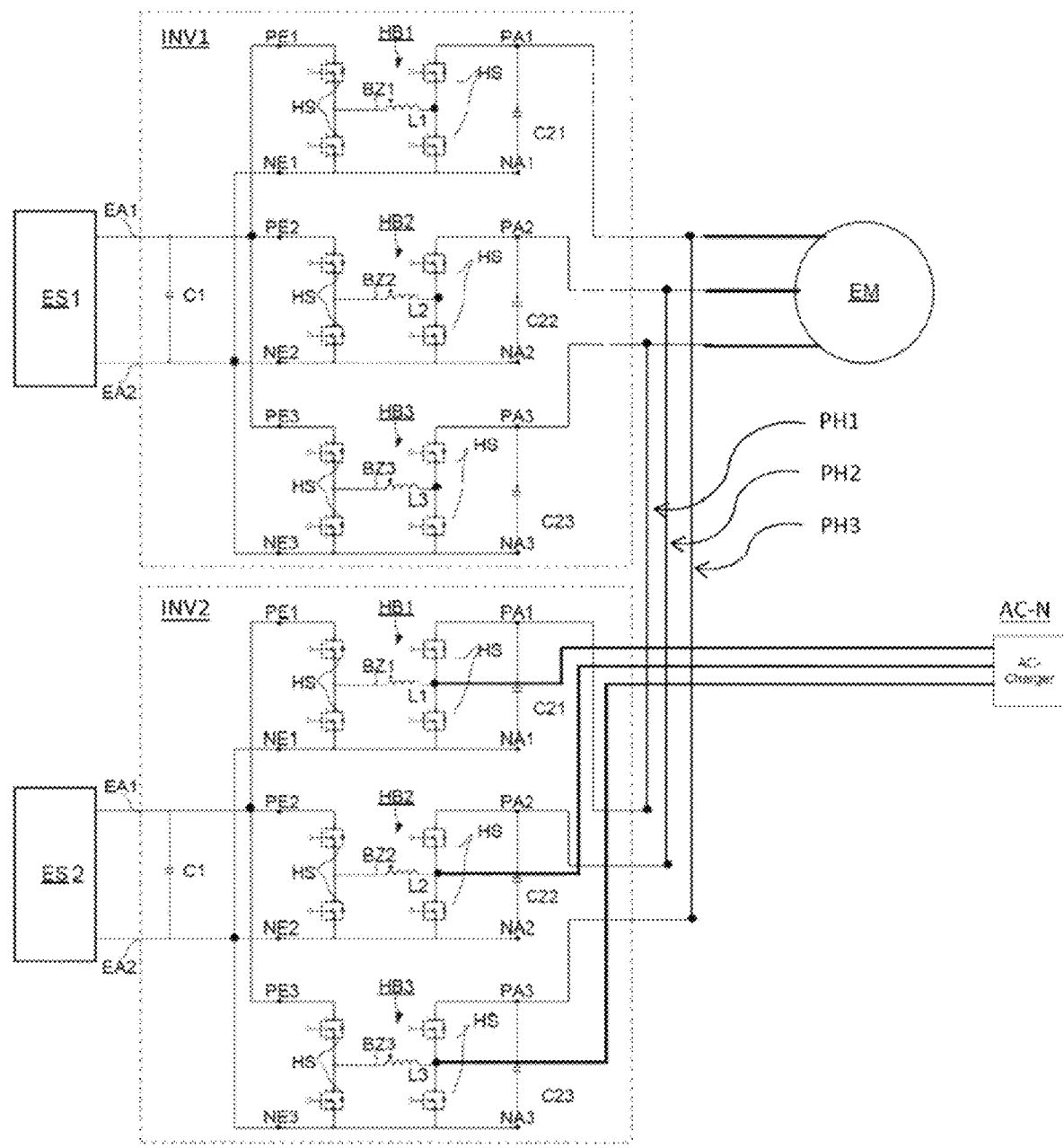
FIG. 2 shows an embodiment of the invention using two APV inverters coupled to an AC motor.

Turning to FIG. 2, an embodiment of the invention is shown with two inverters, INV1 and INV2. The first inverter is shown in this embodiment as electrically connected on the DC side to a DC energy storage ES1 such as a battery. The second inverter is shown in this embodiment as electrically connected to a DC energy source ES2 such as a fuel cell. Other embodiments might include additional inverters coupled to additional energy storage or sources. Both inverters are shown as electrically connected on the AC side to an electrical motor or electrical machine (e-motor or e-machine) shown as EM. The connection is via the three AC phases shown as PH1, PH2, PH3.

In this embodiment, INV1 and INV2 are both multi-phase inverters, and multiple AC phases of the inverter or inverters are adapted to be coupled to the motor. Separate DC connections of the inverter or inverters are adapted to be coupled to the DC electrical energy source and the DC electrical energy storage, such that there is no DC electrical connection between the DC electrical energy source and the DC electrical energy storage.

An optional connection to an AC charger (AC-N) is shown as part of inverter INV2. This connection uses the H-bridges HB1, HB2, HB3 of inverter 2. The charger AC-N might also be replaced by a connection to supply power to an AC network as AC-N, or AC-N might be a bi-directional connection to an AC power network. When the system is implemented in a vehicle, AC-N would be the connection to the immobile AC network, for example in a parking garage or parking lot.

The inverters INV1, INV2 are preferably APV networks, which use a higher frequency across inductors L1, L2, L3 of the respective inverters to transform the voltage levels as needed. Each inverter has 3 H-bridges HB1, HB2, HB3. Each H-bridge comprises 4 switches, labelled HS. The power switches in embodiments may be MOSFET's or IGBT's, or other semiconductor devices, or other electrical switches.

Figure 3:
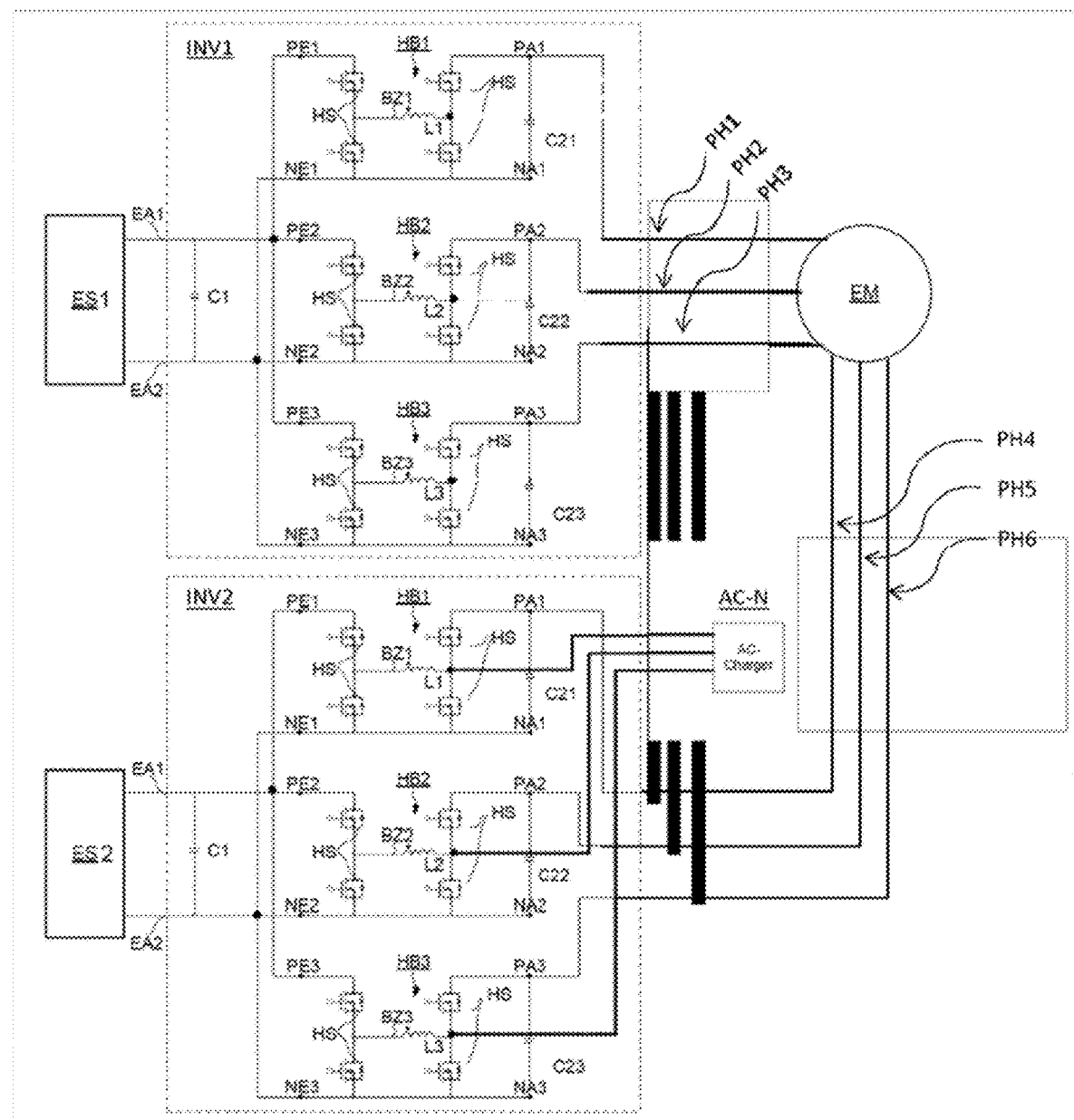
FIG. 3 shows an alternative embodiment of the invention using two APV inverters coupled to an AC motor.

Turning now to FIG. 3, this shows an embodiment of the invention with two inverters, INV1 and INV2, where there is no electrical connection between the AC site of INV1 and INV2. The first inverter is shown in this embodiment as electrically connected on the DC side to a DC energy storage ES1 such as a battery. The second inverter is shown in this embodiment as electrically connected to a DC energy source ES2 such as a fuel cell. Other embodiments might include additional inverters coupled to additional energy storage or sources. Each inverter is shown as separately electrically connected on the AC side to separate phases of electrical motor or electrical machine (e-motor or e-machine) shown as EM.

Inverter INV1 on the AC side generates 3 phases (PH1, PH2, PH3) for the electric motor EM. Likewise, INV2 on the AC side generates 3 additional phases (PH4, PH5, PH6) for the electric motor EM. The 2×3 phase configuration is given as an example, and the person of skill will recognize other configurations as possible, depending particularly on the mechanical configuration of the electric motor EM. Depending on the requirements of the system, the electrical activation of the phases PH1, PH2, PH3 and PH4, PH5, PH6 may be simultaneous at 0 degrees offset (e.g. PH1 and PH4 simultaneously). Alternatively, the phases may be offset by 60 degrees, or some other offset.

As in FIG. 2, an optional connection to an AC charger or network (mains) is shown as (AC-N) being a part of inverter INV2.

The invention claimed is:

1. An electrical system for operating an AC electric motor in conjunction with a DC electrical energy storage and a DC electrical energy source, the system comprising a multi-phase inverter or a set of inverters, wherein multiple AC phases of the inverter or the set of inverters are adapted to be coupled to the motor, and separate DC connections of the inverter or the set of inverters are adapted to be coupled to the DC electrical energy source and the DC electrical energy storage, and at least one DC-DC converter connected to at least one of the DC electrical energy source or the DC electrical energy storage.

2. The system of claim 1, wherein multiple AC phases of the inverter or the set of inverters adapted to be coupled to the DC electrical energy source are electrically connected to multiple AC phases of the inverter or the set of inverters coupled to the DC electrical energy storage.

3. The system of claim 1, wherein AC phases of the inverter or the set of inverters adapted to be coupled to the DC electrical energy source are not electrically connected to an inverter coupled to the DC electrical energy storage.

4. The system of claim 1, wherein the DC electrical energy storage is a battery.

5. The system of claim 1, wherein the DC electrical energy source is a fuel cell.

6. The system of claim 1, wherein the inverter or the set of inverters are adapted to be coupled to additional DC electrical energy storage and/or additional DC electrical energy sources.

7. The system of claim 1, wherein two H-bridges of the inverter or the set of inverters are additionally adapted to be electrically connected to a DC network.

8. The system of claim 1, wherein at least two H-bridges of the inverter or the set of inverters are adapted to be electrically connected to an AC network.

9. The system of claim 8, wherein three H-bridges of an inverter or inverters are adapted to be electrically connected to the AC network.

10. An electrically-driven motor vehicle comprising an AC electric drive or traction motor, a battery, a fuel cell, and a system according to claim 1, wherein the system is electrically coupled to the electric motor, the battery and the fuel cell.

11. A method of operating an electrical system comprising an AC electric motor in conjunction with a DC electrical energy storage and a DC electrical energy source, the method comprising: coupling a multi-phase inverter or a set of inverters to provide multiple AC phases of electrical power to the motor, using separate DC connections of the inverter or the set of inverters to transfer electrical power to and from the DC electrical energy source and the DC electrical energy storage, and connecting at least one DC-DC converter to at least one of the DC electrical energy source or the DC electrical energy storage.

12. The method of claim 11, further comprising electrically connecting multiple AC phases of the inverter or the set of inverters which transfers electrical power from the DC source to multiple AC phases of the inverter or the set of inverters which transfers electrical power to and from the DC storage.

13. The method of claim 11, further comprising leaving AC phases of the inverter or the set of inverters which transfers electrical power from the DC source without electrical connection to AC phases of the inverter or the set of inverters which transfers electrical power to and from the DC storage.

14. The method of claim 11, wherein the DC electrical energy storage is a battery.

15. The method of claim 11, wherein the DC electrical energy source is a fuel cell.

16. An electrical system for operating an AC electric motor in conjunction with a DC electrical energy storage and a DC electrical energy source, the system comprising a multi-phase inverter or a set of inverters, wherein multiple AC phases of the inverter or inverters are adapted to be coupled to the motor, and separate DC connections of the inverter or the set of inverters are adapted to be coupled to the DC electrical energy source and the DC electrical energy storage, such that there is no DC electrical connection between the DC electrical energy source and the DC electrical energy storage, and at least two H-bridges of the inverter or the set of inverters are additionally adapted to be electrically connected to a DC network or to an AC network.

* * * * *